US009158463B2

(12) United States Patent
Oe et al.

(10) Patent No.: US 9,158,463 B2
(45) Date of Patent: Oct. 13, 2015

(54) CONTROL PROGRAM OF STORAGE CONTROL DEVICE, CONTROL METHOD OF STORAGE CONTROL DEVICE AND STORAGE CONTROL DEVICE

(71) Applicant: FUJITSU LIMITED, Kawasaki-shi, Kanagawa (JP)

(72) Inventors: Kazuichi Oe, Yokohama (JP); Motoyuki Kawaba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 14/157,596

(22) Filed: Jan. 17, 2014

(65) Prior Publication Data
US 2014/0297971 A1 Oct. 2, 2014

(30) Foreign Application Priority Data

Mar. 26, 2013 (JP) ................................. 2013-065204

(51) Int. Cl.
*G06F 12/00* (2006.01)
*G06F 3/06* (2006.01)

(52) U.S. Cl.
CPC ............ *G06F 3/0611* (2013.01); *G06F 3/0644* (2013.01); *G06F 3/0647* (2013.01); *G06F 3/0685* (2013.01)

(58) Field of Classification Search
CPC ... G06F 3/0611; G06F 3/0644; G06F 3/0647; G06F 3/0685
See application file for complete search history.

(56) References Cited

U.S. PATENT DOCUMENTS

| 8,909,859 B2 * | 12/2014 | Bandic et al. ................. 711/114 |
| 9,052,830 B1 * | 6/2015 | Marshak et al. ...................... 1/1 |
| 2002/0091902 A1 | 7/2002 | Hirofuji |
| 2010/0057844 A1 * | 3/2010 | Johnson ........................ 709/203 |
| 2014/0325149 A1 * | 10/2014 | Misra et al. ................... 711/114 |

FOREIGN PATENT DOCUMENTS

| JP | 6-119244 | 4/1994 |
| JP | 2002-182978 | 6/2002 |
| JP | 2002-207620 | 7/2002 |

OTHER PUBLICATIONS

Kazuichi OE et al., "Proposal for a hierarchical storage system that can move a spike to high-speed storage in real time", Symposium on Advanced Computing System and Infrastructures (SACSIS2012), May 17, 2012, pp. 92-99, English Abstract.

* cited by examiner

*Primary Examiner* — John Lane
(74) *Attorney, Agent, or Firm* — Fujitsu Patent Center

(57) ABSTRACT

For segments having the number of IOs exceeding a threshold, a data collection unit connects adjacent segments whose distance is within "s" to each other and extracts the connected segments and segments in the range of "s" from outside of the connected segments as an n_segment. A workload analysis unit then determines a target whose data is moved from an HDD to an SSD in units of n_segments.

7 Claims, 12 Drawing Sheets

FIG.3

| n_SEGMENT NUMBER | SEGMENT RANGE | | NUMBER OF IOS | TIME STAMP |
|---|---|---|---|---|
| 1 | 3 | 5 | 1000 | 1 |
| ⋮ | ⋮ | ⋮ | ⋮ | ⋮ |

FIG.4

| n_SEGMENT NUMBER | HEAD SEGMENT NUMBER | NUMBER OF SEGMENTS | NUMBER OF CONTINUATIONS |
|---|---|---|---|
| 1 | 10 | 5 | 1 |
| ⋮ | ⋮ | ⋮ | ⋮ |

CONTROL PROGRAM OF STORAGE CONTROL DEVICE, CONTROL METHOD OF STORAGE CONTROL DEVICE AND STORAGE CONTROL DEVICE

CROSS-REFERENCE TO RELATED APPLICATION

This application is based upon and claims the benefit of priority of the prior Japanese Patent Application No. 2013-065204, filed on Mar. 26, 2013, the entire contents of which are incorporated herein by reference.

FIELD

The embodiment discussed herein is directed to a control program of a storage control device, a control method of a storage control device, a storage control device, and a storage system.

BACKGROUND

When a workload analysis of a storage device such as an HDD (Hard Disk Drive) is performed, a load is often biased to some areas. FIG. 14 is an example of a workload analysis. In FIG. 14, the vertical axis indicates an offset in a downward direction and the horizontal axis indicates an elapsed time. The offset represents a difference from a head address of a volume allocated to a user. The elapsed time is measured in the unit of minutes.

In FIG. 14, the black part is a high load area. Three blocks are present as the high load area in FIG. 14. Among the high load areas, for an area that is generated similarly on a daily basis, static hierarchical control is effective. The static hierarchical control is a technique of moving data of a high load area to a storage device such as an SSD (Solid State Drive), which works at a speed higher than that of an HDD, by using previous statistical information at a pre-determined time on a daily basis.

For example, in FIG. 14, when a block A and a block B among the three blocks are generated similarly on a daily basis, data corresponding to the blocks A and B are moved to an SSD, so that frequently accessed data is accessed at a high speed. Therefore, by using the static hierarchical control, the performance of an information processing system can be improved.

Meanwhile, in FIG. 14, when a block C is generated only on a particular day, the block C cannot be moved to the SSD by using the static hierarchical control. Accordingly, dynamic hierarchical control that moves data of a high load area to the SSD based on a load that is measured in real time is executed on the block C (see, for example, Kazuichi Oe, Kazutaka Ogihara, Yasuo Noguchi, and Toshihiro Ozawa, "Proposal for a hierarchical storage system that can move a spike to high-speed storage in real time", the Annual Symposium on Advanced Computing Systems and Infrastructures (SACSIS2012), Kobe, Japan, May 2012).

There has been a conventional technique in which, when a highly-frequently accessed file is accessed, based on related information such as a sector used by the file, a disk array device reads data that is stored in a sector in a predetermined neighborhood of the sector used by the file in a hard disk into a cache. Furthermore, there has been a conventional technique of, when a presence density that is the rate at which an accessed logical track is present is increased or equal to or larger than a certain value, determining as sequential access or generally sequential access and pre-reading a neighborhood of a block in which data is present from an external storage device. Further, there has been a conventional technique in which, in a disk control device including a cache, a neighboring part of an accessed physical area is also loaded.

Patent Document 1: Japanese Laid-open Patent Publication No. 2002-207620

Patent Document 2: Japanese Laid-open Patent Publication No. 2002-182978

Patent Document 3: Japanese Laid-open Patent Publication No. 06-119244

By applying the conventional techniques of moving data of a neighborhood of a high load area to dynamic hierarchical control that moves data of a high load area to an SSD based on a load measured in real time, the performance of an information processing system can be improved. However, in order to move the data of the neighborhood of the high load area to the SSD, an area that is appropriate as the neighborhood needs to be selected.

SUMMARY

According to an aspect of an embodiment, a non-transitory computer-readable storage medium stores a program. The program includes counting number of inputs and outputs for each unit area of a plurality of unit areas obtained by dividing an area that is used in a first storage device into a predetermined size; first identifying a unit area having the number of inputs and outputs larger than a first threshold as a high load area; second identifying an area obtained by combining an extended area in which an identified high load area and a unit area or unit areas within a predetermined distance from the high load area are connected to each other with other extended areas connected to the extended area, as a movement area; and moving data of an identified movement area to a second storage device that has a speed higher than that of the first storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an example of a database;

FIG. 4 is an example of a candidate table;

DESCRIPTION OF EMBODIMENT(S)

Preferred embodiments of the present invention will be explained with reference to accompanying drawings. These embodiments are not intended to limit the disclosed techniques.

Figure 1A:
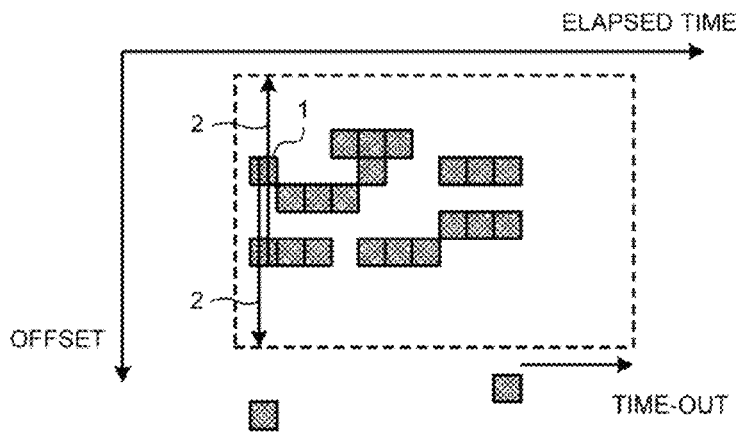
FIG. 1A is an explanatory diagram of dynamic hierarchical control by a hierarchical-storage control device according to an embodiment.
Figure 1B:
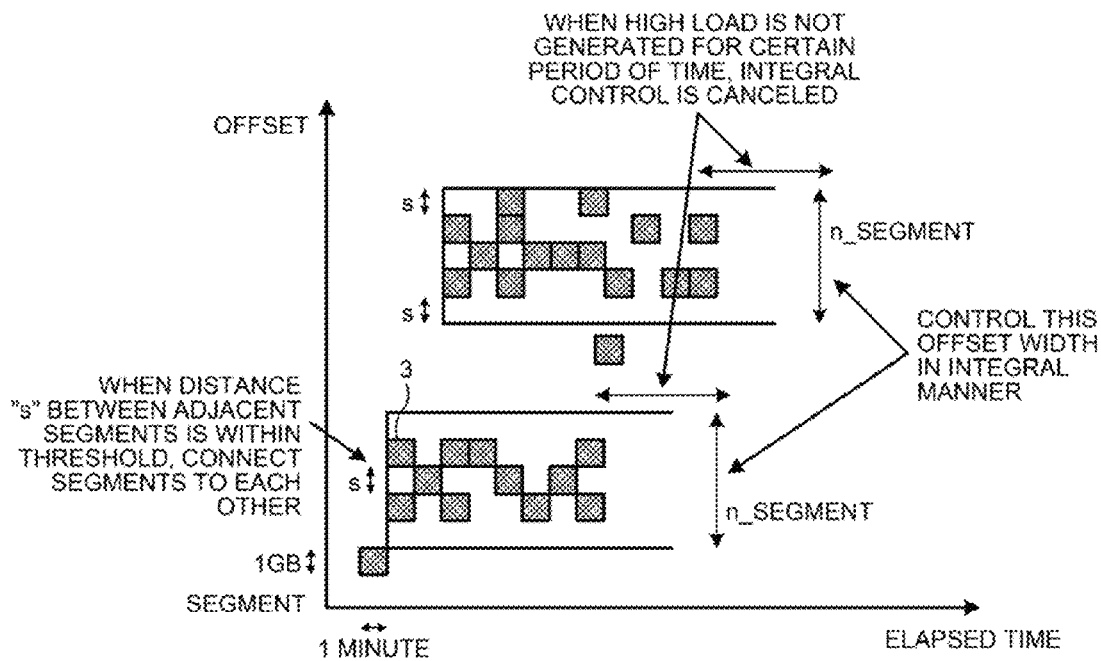
FIG. 1B is an explanatory diagram of dynamic hierarchical control by the hierarchical-storage control device according to the embodiment.

Dynamic hierarchical control by a hierarchical-storage control device according to an embodiment is explained first. FIGS. 1A and 1B are explanatory diagrams of dynamic hierarchical control by the hierarchical-storage control device according to the present embodiment.

FIG. 1A is an example of a workload analysis of a storage device. In FIG. 1A, the vertical axis indicates an offset in a downward direction and the horizontal axis indicates an elapsed time. In FIG. 1A, a hatched area 1 represents a high load area. As indicated by an arrow 2, the hierarchical-storage control device according to the present embodiment sets a certain range from the high load area as an extended area.

The hierarchical-storage control device according to the present embodiment assumes the extended area and other extended areas connected to the extended area to be one extended area. The hierarchical-storage control device according to the present embodiment then sets the extended area as a movement area whose data is moved to an SSD. In FIG. 1A, the area between upper and lower broken lines is the movement area.

When the hierarchical-storage control device according to the present embodiment determines the movement area at a certain time point, the device maintains the movement area until a high load is not generated for a certain period of time. That is, when a high load area disappears and a high load is not generated for a certain period of time, the hierarchical-storage control device according to the present embodiment determines that a high load has disappeared. In FIG. 1A, a time-out arrow indicates a certain period of time during which a high load is not generated.

FIG. 1B is another example of the workload analysis of a storage device. In FIG. 1B, the vertical axis indicates an offset in an upward direction and the horizontal axis indicates an elapsed time. The volume is divided into 1 GB (gigabyte) segments and the elapsed time is measured per minute. That is, in FIG. 1B, a hatched square area 3 indicates that one segment had a high load for 1 minute. "s" represents the number of segments that are extended from a high load area as an extended area. In FIG. 1B, s=1.

The hierarchical-storage control device according to the present embodiment connects segments of the high load area whose distance is within "s", thereby creating an n_segment. The n_segment is a movement area whose data is moved to an SSD and is controlled in an integral manner with respect to the data movement. The number of segments of the n_segment is equal to or larger than 2s+1. In FIG. 1B, two n_segments with the number of segments of 5 are identified.

In this manner, the hierarchical-storage control device according to the present embodiment identifies the n_segment as the area whose data is moved to an SSD, thereby being capable of selecting an area appropriate as a neighborhood of the high load area.

Figure 2:
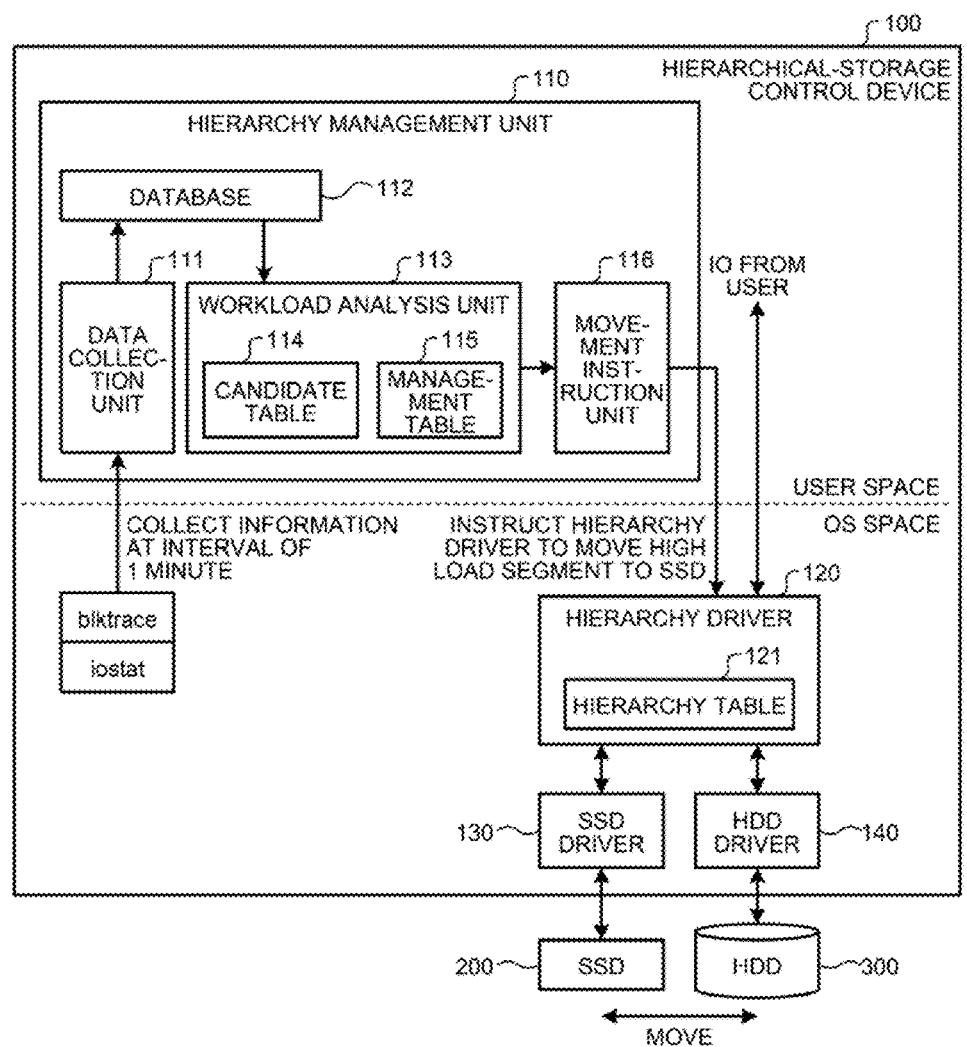
FIG. 2 depicts a functional configuration of the hierarchical-storage control device according to the embodiment.

Next, a functional configuration of the hierarchical-storage control device according to the present embodiment is explained. FIG. 2 depicts a functional configuration of the hierarchical-storage control device according to the present embodiment. As illustrated in FIG. 2, a hierarchical-storage control device 100 includes a hierarchy management unit 110, a hierarchy driver 120, an SSD driver 130, and an HDD driver 140.

The hierarchical-storage control device 100 constitutes a hierarchical storage system with an SSD 200 and an HDD 300. The hierarchical-storage control device 100 is realized by executing a hierarchical-storage control program having the same functional configuration as the hierarchical-storage control device 100 in a computer. The hierarchy management unit 110 is realized as a program that is executed in a user space, and the hierarchy driver 120, the SSD driver 130, and the HDD driver 140 are realized as programs that are executed in an OS space.

The hierarchy management unit 110 determines an n_segment whose data is moved to the SSD 200 based on information of IOs traced in the HDD 300 by using blktrace or iostat, and instructs the hierarchy driver 120 to move the data of the determined n_segment. The blktrace is a command to trance an IO on a block I/O layer level. The iostat is a command to confirm the usage state of a disk I/O. The blktrace and the iostat are executed in the OS space.

The hierarchy management unit 110 includes a data collection unit 111, a database 112, a workload analysis unit 113, and a movement instruction unit 116.

The data collection unit 111 collects the information of IOs traced in the HDD 300 by using the blktrace or the iostat at an interval of 1 minute and identifies an n_segment based on the collected information. The data collection unit 111 then attaches an n_segment number to the identified n_segment and writes the n_segment number, a segment range, and the number of IOs in the database 112 along with a time stamp.

The n_segment number is the number for identifying an n_segment. The segment range is offsets of the head segment and the last segment of an n_segment. The number of IOs is the total number of IOs to and from an n_segment for 1 minute. The time stamp is an identifier for identifying the time. The data collection unit 111 does not newly attach a number to an n_segment that has the same segment range as the n_segment to which the number has been previously attached, and uses the n_segment number that has been previously attached.

As illustrated in FIG. 1B, the data collection unit 111 connects segments of a high load area whose distance is within "s" to each other, thereby creating an n_segment. By the data collection unit 111 connecting the segments of the high load area whose distance is within "s" to each other and creating the n_segment, the hierarchical-storage control device 100 can select an area appropriate as a neighborhood of the high load area.

The database 112 stores therein information about the n_segment identified by the data collection unit 111. FIG. 3 is an example of the database 112. As illustrated in FIG. 3, the database 112 stores therein, for each n_segment, the n_segment number, the segment range, the number of IOs, and the time stamp in a corresponding manner. For example, according to an n_segment with the n_segment number of "1", the offset of the head segment is "3", the offset of the last segment is "5", the number of IOs is "1000", and the time stamp is "1".

The workload analysis unit 113 selects an n_segment whose data is moved to the SSD 200 among n_segments stored in the database 112 and passes information about the selected n_segment to the movement instruction unit 116.

Specifically, the workload analysis unit 113 sorts n_segments in descending order of the number of IOs. The workload analysis unit 113 then performs the following calculation until "m" reaches max_seg_num or io_rate exceeds io_rate_value.

$$\text{io\_concentration} = \sum_{k=1}^{m} \text{seg\_sort}(k) \quad (1)$$

$$\text{io\_rate} = (\text{io\_concentration} * 100) / \text{io\_all}$$

where the max_seg_num represents the number of n_segments whose data is simultaneously moved to the SSD 200. The seg_sort(k) represents the number of IOs of the kth most accessed n_segment. The io_concentration represents the total number of IOs of the top-k n_segments. A larger number of the io_concentration represents that access is concentrated on the top-k n_segments. The io_all represents the total of the number of IOs of all n_segments. The io_rate represents the rate of the total number of IOs of the top-k n_segments to the total, represented in percentage. Accordingly, a larger number of the io_rate represents that the rate of concentration of access to the top-k n_segments is high.

The io_rate_value is a threshold for determining whether the top-k n_segments are selected as candidates whose data are moved to the SSD 200. That is, when the io_rate exceeds the io_rate_value, the rate of concentration of access to the top-k n_segments is high, and therefore the workload analysis unit 113 determines the top-k n_segments as the candidates whose data are moved to the SSD 200.

The workload analysis unit 113 includes a candidate table 114 and a management table 115. The workload analysis unit 113 registers the candidates whose data are moved to the SSD 200 in the candidate table 114 and an n_segment that is selected as a target whose data is moved to the SSD 200 in the management table 115.

FIG. 4 is an example of the candidate table 114. As illustrated in FIG. 4, the candidate table 114 stores therein, for each n_segment, the n_segment number, the head segment number, the number of segments, and the number of continuations in a corresponding manner. The head segment number is the offset of the head segment of an n_segment. The number of segments is the number of segments included in an n_segment.

The number of continuations represents the number that an n_segment is continuously registered as a candidate in the candidate table 114. The workload analysis unit 113 takes out all n_segments having a certain time stamp attached thereto at an interval of 1 minute and calculates the io_concentration and the io_rate. When the workload analysis unit 113 identifies a candidate in which the io_rate exceeds the io_rate_value and registers the candidate in the candidate table 114, the workload analysis unit 113 adds "1" to the number of continuations with respect to n_segments that have been previously registered therein. At the time of the workload analysis unit 113 registering a candidate in the candidate table 114, when the candidate has not been registered therein, the workload analysis unit 113 newly creates an entry and sets the number of continuations to "0". For the n_segment that has been registered in the candidate table 114 but is not identified as a candidate this time, the workload analysis unit 113 resets the number of continuations to "0". An initial value of the number of continuations is "0".

The workload analysis unit 113 then selects an n_segment in which the number of continuations exceeds a predetermined threshold and a state of a high IO concentration rate is expected to last longer than the time required for moving data to the SSD 200 as a target whose data is moved to the SSD 200. The workload analysis unit 113 registers the n_segment selected as the movement target in the management table 115.

Figure 5:
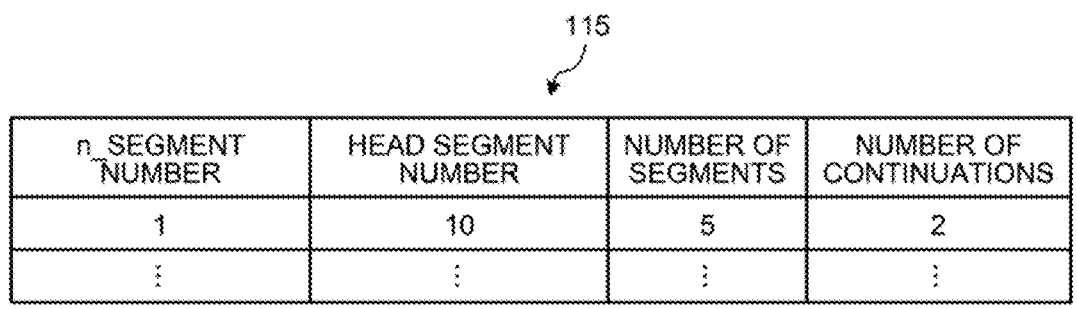
FIG. 5 is an example of a management table.

FIG. 5 is an example of the management table 115. As illustrated in FIG. 5, the management table 115 stores therein, for each n_segment, the n_segment number, the head segment number, the number of segments, and the number of continuations in a corresponding manner.

The number of continuations represents the number that an n_segment is not continuously selected when the top-k candidates are selected. That is, when the top-k candidates are selected, the workload analysis unit 113 adds the number of continuations of an n_segment that is not selected as a candidate to "1", and resets the number of continuations of an n_segment that is selected as a candidate to "0". An initial value of the number of continuations is "0".

The workload analysis unit 113 instructs the movement instruction unit 116 to move data of an n_segment whose number of continuations exceeds a predetermined threshold from the SSD 200 to the HDD 300, and deletes this n_segment from the management table 115.

Referring back to FIG. 2, the movement instruction unit 116 instructs the hierarchy driver 120 to move data of an n_segment from the HDD 300 to the SSD 200 or from the SSD 200 to the HDD 300 based on an instruction from the workload analysis unit 113.

At this time, the movement instruction unit 116 converts a volume offset of each segment that belongs to an n_segment into an offset on the HDD 300, and instructs the hierarchy driver 120 to move the data for each segment. For example, in a case where the sector size of the HDD 300 is 512 Bytes, when the volume offset is 1 GB, the offset on the HDD 300 is 1×1024×1024×1024/512=2097152.

The hierarchy driver 120 includes a hierarchy table 121, and distributes an IO from a user to a hierarchical storage to the HDD driver 140 or the SSD driver 130 by using the hierarchy table 121. Further, the hierarchy driver 120 executes a segment movement instruction from the movement instruction unit 116 by using the hierarchy table 121, the SSD driver 130, and the HDD driver 140.

Figure 6:
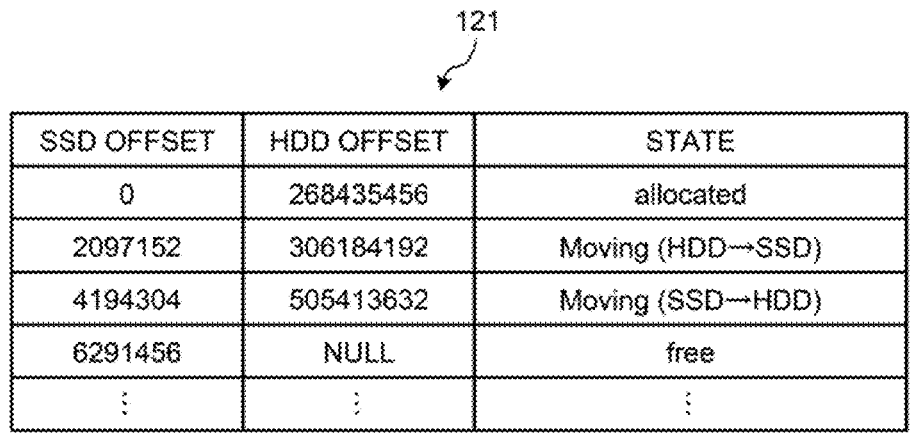
FIG. 6 is an example of a hierarchy table.

FIG. 6 is an example of the hierarchy table 121. As illustrated in FIG. 6, the hierarchy table 121 stores therein, for each segment whose data has been moved to the SSD 200, an SSD offset, an HDD offset, and a state in a corresponding manner.

The SSD offset represents an offset of a segment whose data has been moved to the SSD 200 in the SSD 200. The SSD offset has fixed values in units of offset 2097152 corresponding to a size of 1 GB in a volume and has "0", "2097152", "4194304", "6291456" and onward.

The HDD offset represents an offset of a segment whose data has been moved to the SSD 200 in the HDD 300. "NULL" serving as a value of the HDD offset indicates that an area of the SSD 200 designated by the SSD offset is unused.

The state represents a state of a segment and the state is denoted by "allocated", "Moving (HDD→SSD)", "Moving (SSD→HDD)", or "free". "allocated" indicates that a segment has been allocated to an SSD. "Moving (HDD→SSD)" indicates that data of a segment is being transferred from the HDD 300 to the SSD 200. "Moving (SSD→HDD)" indicates that data of a segment is being transferred from the SSD 200 to the HDD 300. "free" indicates that an area of the SSD 200 designated by the SSD offset is unused.

Referring back to FIG. 2, the SSD driver 130 controls access to the SSD 200 based on an instruction of the hierarchy driver 120. The HDD driver 140 controls access to the HDD 300 based on an instruction of the hierarchy driver 120.

Figure 7:
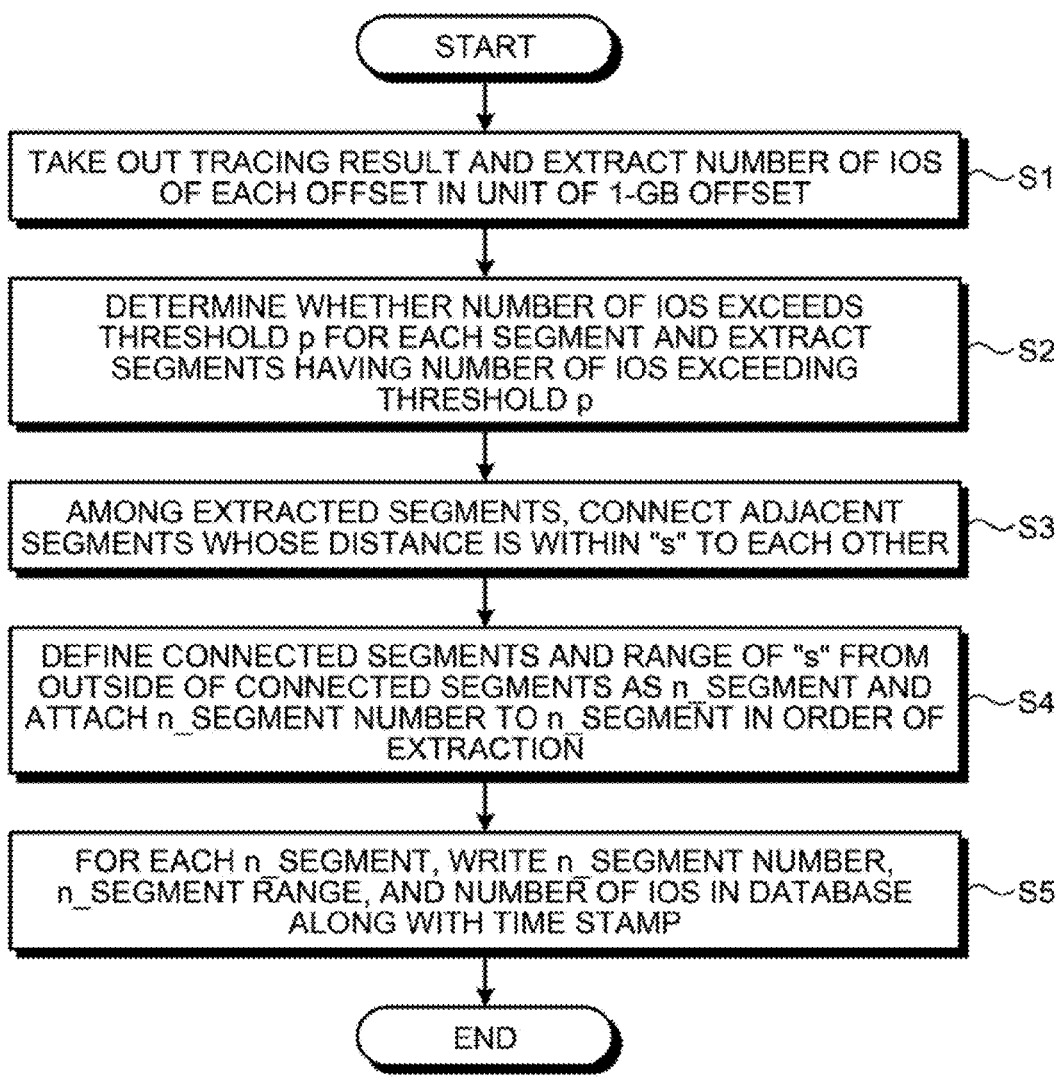
FIG. 7 is a flowchart of a process procedure of a data collection unit.

Next, a process procedure of the data collection unit 111 is explained. FIG. 7 is a flowchart of the process procedure of the data collection unit 111. The data collection unit 111 is activated under a condition that a blktrace command is executed for 60 seconds.

As illustrated in FIG. 7, the data collection unit 111 takes out a tracing result obtained by executing a blktrace command and extracts the number of IOs of each segment in units of 1-GB offset, that is, in units of segments (Step S1).

The data collection unit 111 determines whether the number of IOs exceeds a threshold p for each segment and extracts a segment having the number of IOs exceeding the threshold p (Step S2). The segment having the number of IOs exceeding the threshold p is a high load area.

The data collection unit 111 then connects, among extracted segments, adjacent segments whose distance is within "s" to each other (Step S3). The data collection unit 111 defines the connected segments and segments in the range of "s" from outside of the connected segments as an n_segment, and attaches an n_segment number to the n_segment in order of extraction (Step S4).

The data collection unit 111 then writes, for each n_segment, the n_segment number, the segment range, and the number of IOs in the database 112 along with a time stamp (Step S5).

In this manner, the data collection unit 111 connects, among high load segments, adjacent segments whose distance is within "s" to each other, thereby extracting an n_segment. As a result, a neighborhood of the high load segments can be appropriately selected.

Figure 8:
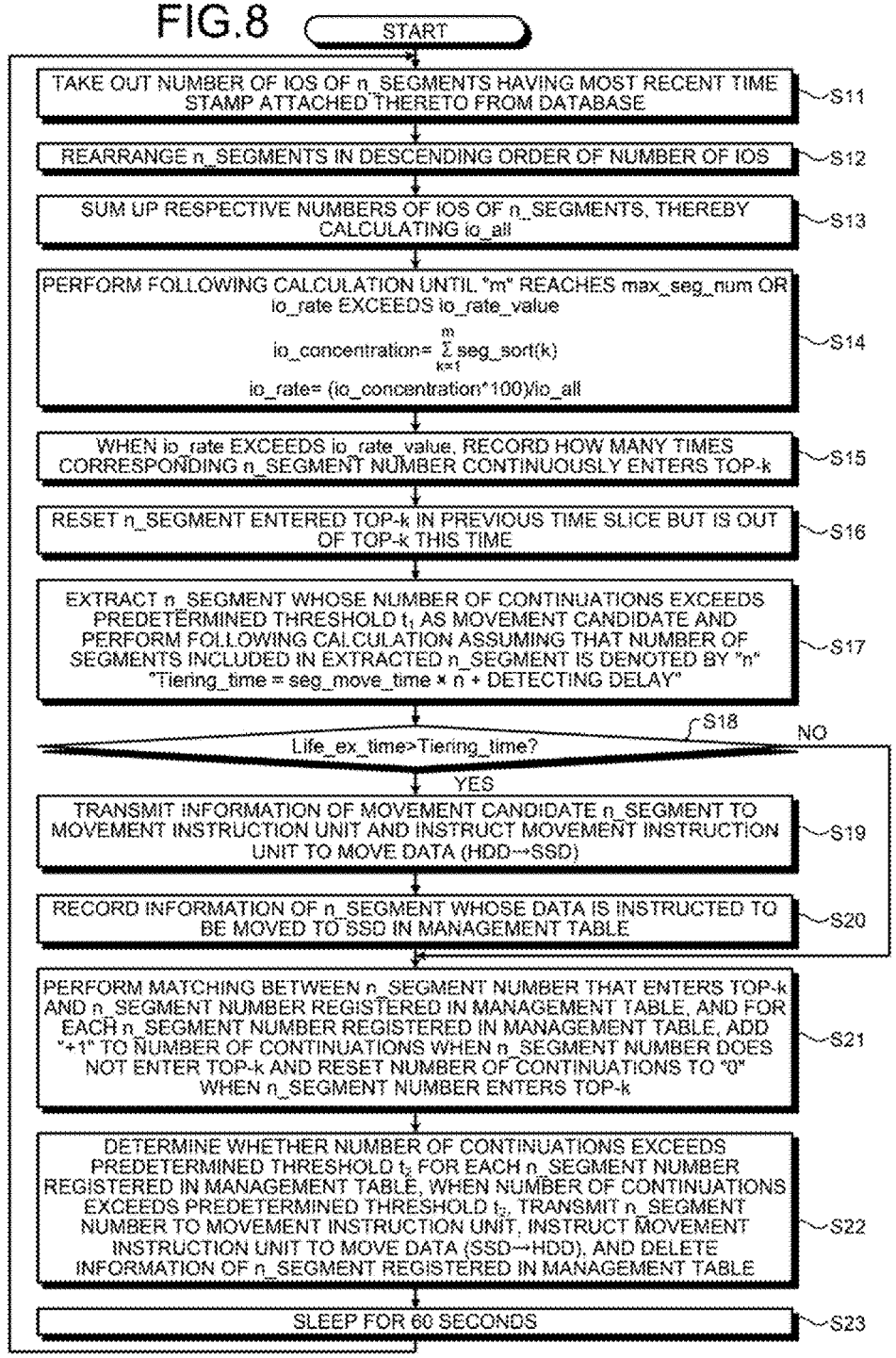
FIG. 8 is a flowchart of a process procedure of a workload analysis unit.

Next, a process procedure of the workload analysis unit 113 is explained. FIG. 8 is a flowchart of the process procedure of the workload analysis unit 113. As illustrated in FIG. 8, the workload analysis unit 113 takes out the number of IOs of n_segments having the most recent time stamp attached thereto from the database 112 (Step S11), and rearranges the n_segments in descending order of the number of IOs (Step S12).

The workload analysis unit 113 then sums up the respective numbers of IOs of the n_segments, thereby calculating the io_all (Step S13). The workload analysis unit 113 performs the following calculation until "m" reaches the max_seg_num or the io_rate exceeds the io_rate_value (Step S14).

$$\text{io\_concentration} = \sum_{k=1}^{m} \text{seg\_sort}(k) \quad (2)$$

$$\text{io\_rate} = (\text{io\_concentration} * 100) / \text{io\_all}$$

When the io_rate exceeds the io_rate_value, the workload analysis unit 113 performs the following Steps S15 to S22. When "m" reaches the max_seg_num, the workload analysis unit 113 proceeds to Step S23. That is, when the io_rate exceeds the io_rate_value, the workload analysis unit 113 records how many times the corresponding n_segment numbers continuously enter the top-k in the candidate table 114 (Step S15). Further, the workload analysis unit 113 resets the number of continuations of an n_segment that entered the top-k in the previous time slice but is out of the top-k this time (Step S16).

The workload analysis unit 113 then extracts an n_segment whose number of continuations exceeds a predetermined threshold $t_1$ as a movement candidate, and calculates a Tiering_time that is a movement time of data of the n_segment assuming that the number of segments included in the extracted n_segment is denoted by "n" (Step S17).

At this time, "Tiering_time=seg_move_time×n+detecting delay". The seg_move_time indicates the time required for moving 1-segment data from the HDD 300 to the SSD 200. The detecting delay is the time required for detecting the movement candidate and is assumed to be 60 seconds serving as a data collecting interval.

The workload analysis unit 113 then compares the Tiering_time to Life_ex_time that indicates the time during which a state of a high IO concentration rate is expected to last (Step S18). When the Tiering_time is not smaller than the Life_ex_time, the workload analysis unit 113 proceeds to Step S21. On the other hand, when the Tiering_time is smaller than the Life_ex_time, the workload analysis unit 113 transmits information of the movement candidate n_segment to the movement instruction unit 116 and instructs the movement instruction unit 116 to move the data of the movement candidate n_segment from the HDD 300 to the SSD 200 (Step S19). The workload analysis unit 113 records the information of the n_segment whose data is instructed to be moved to the SSD 200 in the management table 115 (Step S20).

Next, the workload analysis unit 113 performs matching between an n_segment number that enters the top-k and an n_segment number registered in the management table 115. For each n_segment registered in the management table 115, the workload analysis unit 113 adds "+1" to the number of continuations when an n_segment number does not enter the top-k and resets the number of continuations to "0" when the n_segment number enters the top-k (Step S21).

The workload analysis unit 113 determines whether the number of continuations exceeds a predetermined threshold $t_2$ for each n_segment number registered in the management table 115. When the number of continuations exceeds the predetermined threshold $t_2$, the workload analysis unit 113 transmits the n_segment number to the movement instruction unit 116 and instructs the movement instruction unit 116 to move the data from the SSD 200 to the HDD 300. The workload analysis unit 113 deletes the information of the n_segment registered in the management table 115 (Step S22). The workload analysis unit 113 then sleeps for 60 seconds and returns to Step S11.

In this manner, the workload analysis unit 113 instructs the movement instruction unit 116 to move data of an n_segment having a high IO concentration rate from the HDD 300 to the SSD 200, so that a user can access data of the HDD 300 at a high speed.

Figure 9:
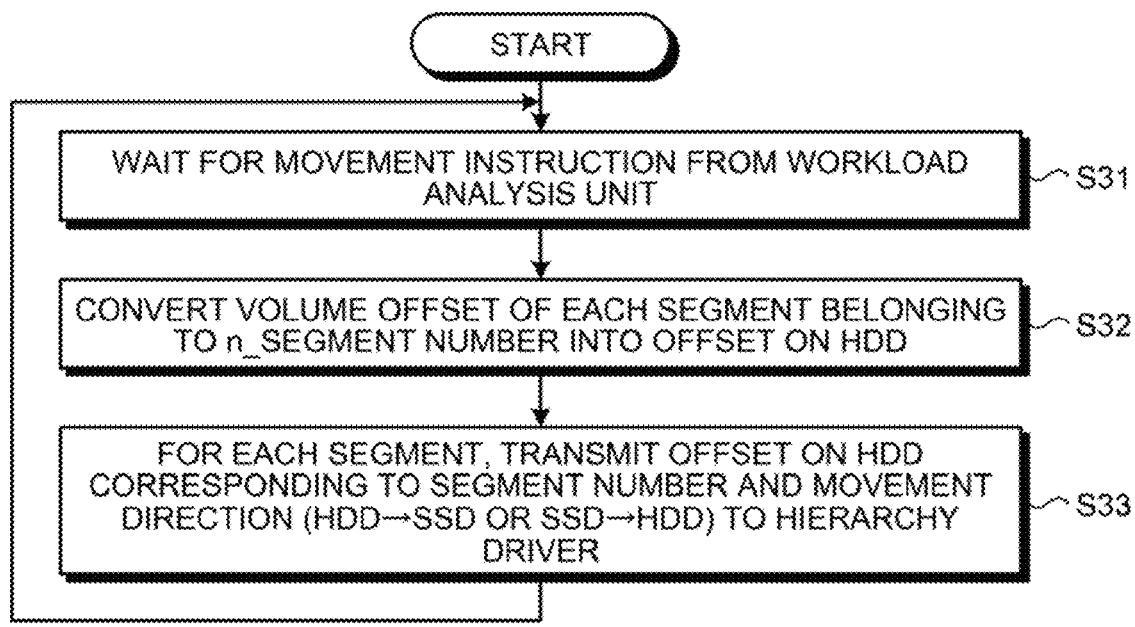
FIG. 9 is a flowchart of a process procedure of a movement instruction unit.

Next, a process procedure of the movement instruction unit 116 is explained. FIG. 9 is a flowchart of the process procedure of the movement instruction unit 116. As illustrated in FIG. 9, the movement instruction unit 116 waits for a movement instruction from the workload analysis unit 113 (Step S31).

When the movement instruction unit 116 receives the movement instruction, the movement instruction unit 116 converts a volume offset of each segment that belongs to an n_segment number into an offset on the HDD 300 (Step S32).

The movement instruction unit 116 then transmits, for each segment, the offset on the HDD 300 corresponding to the segment number and a data movement direction to the hierarchy driver 120 (Step S33). The data movement direction is from the HDD 300 to the SSD 200 or from the SSD 200 to the HDD 300. The movement instruction unit 116 then returns to Step S31 and waits for the movement instruction from the workload analysis unit 113.

In this manner, the movement instruction unit 116 converts the volume offset of each segment into the offset on the HDD 300, so that the hierarchy driver 120 can move data between the SSD 200 and the HDD 300.

Figure 10A:
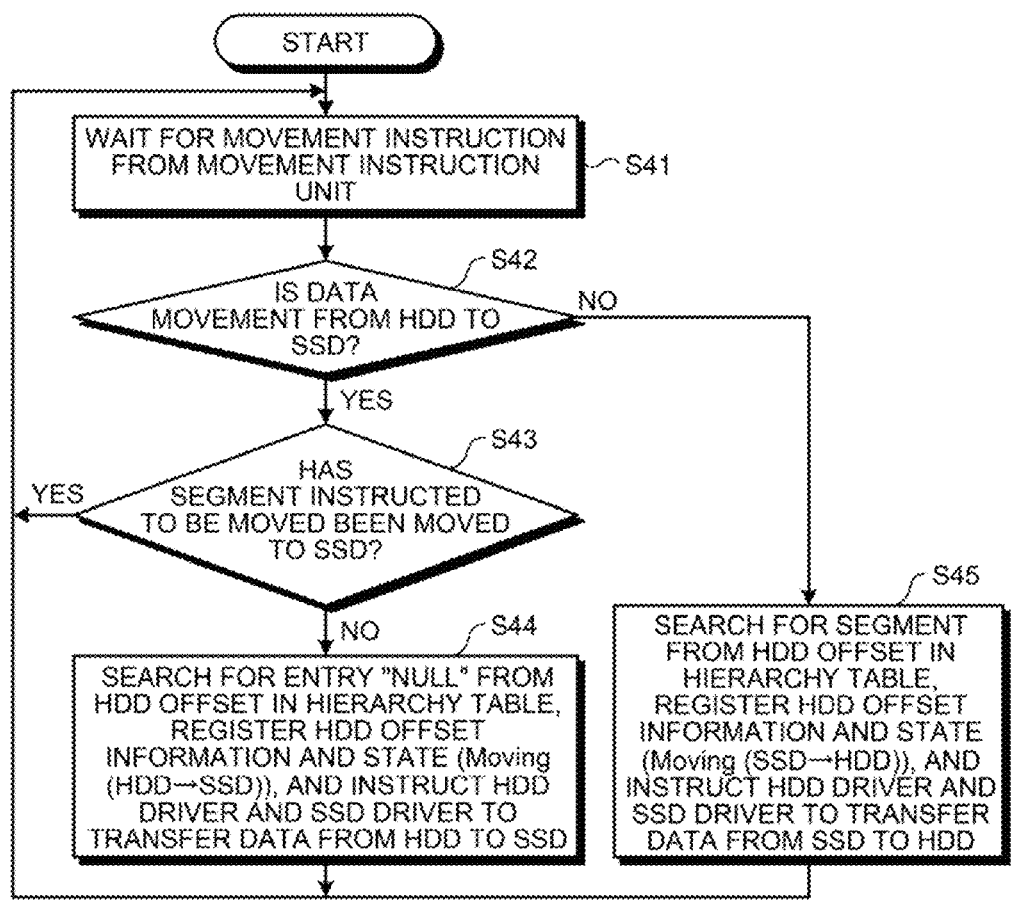
FIG. 10A is a flowchart of a process procedure of a hierarchy driver when the hierarchy driver receives a movement instruction.

Next, a process procedure of the hierarchy driver 120 when the hierarchy driver 120 receives a movement instruction is explained with reference to FIGS. 10A and 10B. FIG. 10A is a flowchart of the process procedure of the hierarchy driver 120 when the hierarchy driver 120 receives a movement instruction.

As illustrated in FIG. 10A, the hierarchy driver 120 waits for a movement instruction from the movement instruction unit 116 (Step S41). When the hierarchy driver 120 receives the movement instruction, the hierarchy driver 120 determines whether the data movement is from the HDD 300 to the SSD 200 (Step S42).

As a result of determination, when the data movement is from the HDD 300 to the SSD 200, the hierarchy driver 120 determines whether a segment that is instructed to be moved has been moved to the SSD 200 (Step S43). When the segment has been moved to the SSD 200, the hierarchy driver 120 returns to Step S41.

On the other hand, when the segment has not been moved to the SSD 200, the hierarchy driver 120 searches for an entry "NULL" from the HDD offset in the hierarchy table 121 and registers therein the HDD offset information and the state. The registered state is "Moving (HDD→SSD)". The hierarchy driver 120 then instructs the HDD driver 140 and the SSD driver 130 to transfer data from the HDD 300 to the SSD 200 (Step S44), and returns to Step S41.

When the data movement is not from the HDD 300 to the SSD 200, the hierarchy driver 120 searches for a segment from the HDD offset in the hierarchy table 121 and registers the HDD offset information and the state. The registered state is "Moving (SSD→HDD)". The hierarchy driver 120 then instructs the HDD driver 140 and the SSD driver 130 to transfer data from the SSD 200 to the HDD 300 (Step S45) and returns to Step S41.

Next, a process procedure of the hierarchy driver 120 when the hierarchy driver 120 receives a transfer completion notification after giving a transfer instruction to the HDD driver 140 and the SSD driver 130 is explained. FIG. 10B is a flowchart of the process procedure of the hierarchy driver 120 when the hierarchy driver 120 receives a transfer completion notification after giving a transfer instruction to the HDD driver 140 and the SSD driver 130.

Figure 10B:
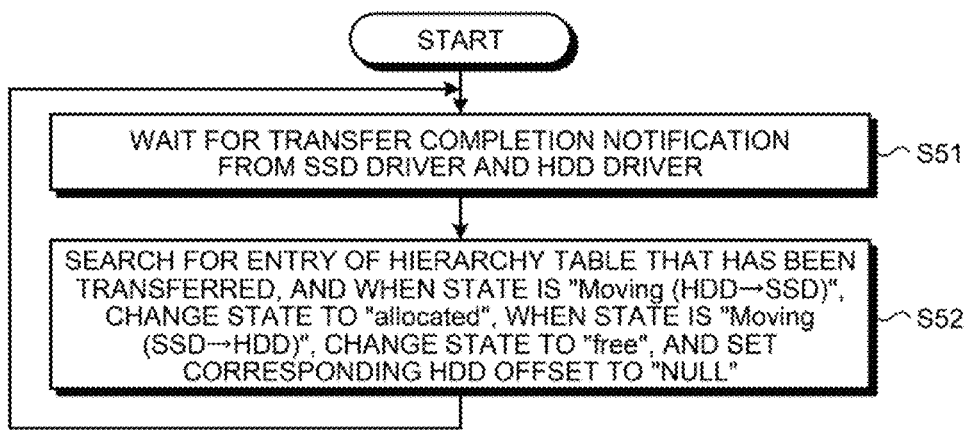
FIG. 10B is a flowchart of a process procedure of the hierarchy driver when the hierarchy driver receives a transfer completion notification after giving a transfer instruction.

As illustrated in FIG. 10B, the hierarchy driver 120 waits for a transfer completion notification from the SSD driver 130 and the HDD driver 140 (Step S51). The hierarchy driver 120 then searches for an entry of the hierarchy table 121 that has been transferred by using the HDD offset, and when the state is "Moving (HDD→SSD)", the hierarchy driver 120 changes the state to "allocated". On the other hand, when the state is "Moving (SSD→HDD)", the hierarchy driver 120 changes the state to "free" and sets the corresponding HDD offset to "NULL" (Step S52).

In this manner, the hierarchy driver 120 transfers data between the SSD 200 and the HDD 300 by using the hierarchy table 121, so that data of a segment on which an IO concentrates can be placed in the SSD 200.

Figure 11:
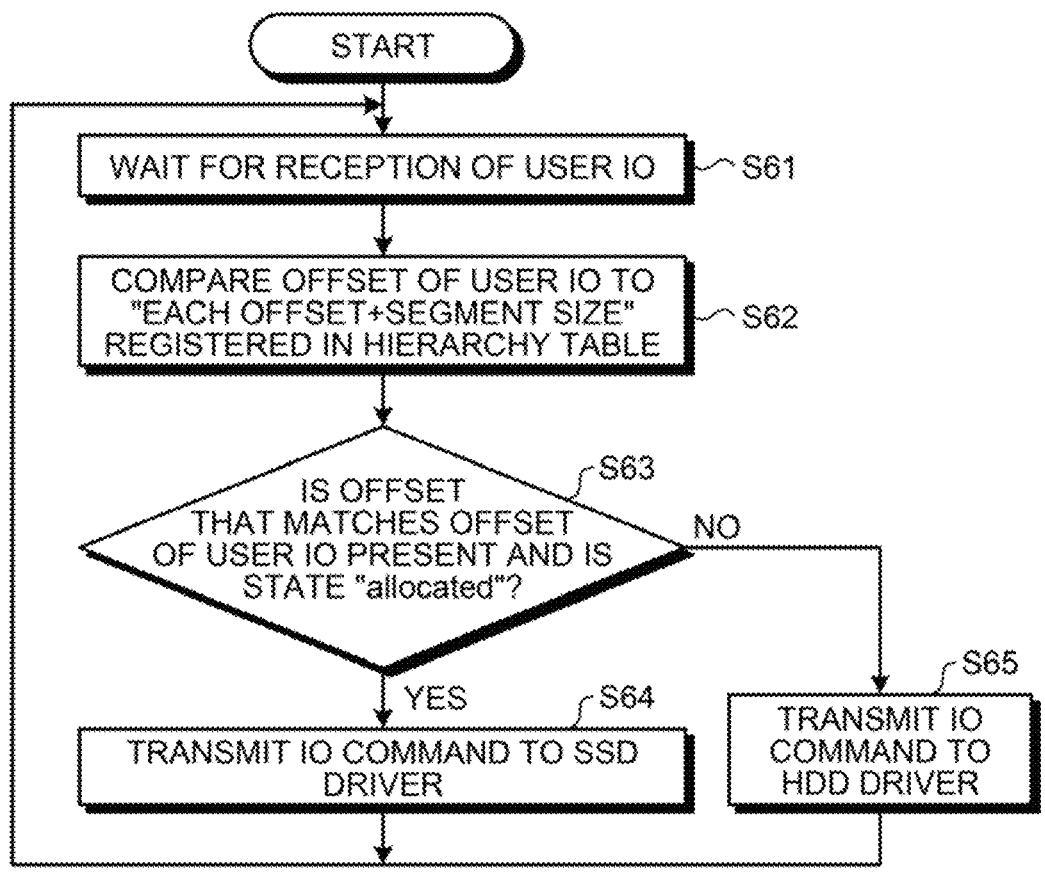
FIG. 11 is a flowchart of a process procedure of the hierarchy driver when the hierarchy driver receives a user IO.

Next a process procedure of the hierarchy driver 120 when the hierarchy driver 120 receives a user IO is explained. FIG. 11 is a flowchart of the process procedure of the hierarchy driver 120 when the hierarchy driver 120 receives a user IO.

As illustrated in FIG. 11, the hierarchy driver 120 waits for reception of a user IO (Step S61). When the hierarchy driver 120 receives the user IO, the hierarchy driver 120 compares an offset of the user IO to "each offset+segment size" registered in the hierarchy table 121 (Step S62).

The hierarchy driver 120 determines whether an offset that matches the offset of the user IO is present in any of the segments registered in the hierarchy table 121 and the state of the detected segment is "allocated" (Step S63).

As a result of determination, when the offset that matches the offset of the user IO is present and the state is "allocated", the hierarchy driver 120 transmits an IO command to the SSD driver 130 (Step S64). On the other hand, when the offset that matches the offset of the user IO is not present or when the state is not "allocated", the hierarchy driver 120 transmits an IO command to the HDD driver 140 (Step S65). The hierarchy driver 120 then returns to Step S61 and waits for reception of a user IO.

As explained above, according to the present embodiment, among segments whose number of IOs exceeds the threshold p, the data collection unit 111 connects adjacent segments whose distance is within "s" to each other and extracts the connected segments and segments in the range of "s" from outside of the connected segments as an n_segment. The workload analysis unit 113 then determines a target whose data is moved from the HDD 300 to the SSD 200 in units of n_segments. Therefore, the hierarchical-storage control device 100 can appropriately select a neighborhood of a high load area and move data from the HDD 300 to the SSD 200, thereby being capable of accessing the HDD 300 at a high speed.

While the present embodiment has explained the case where an extracted n_segment is not changed with time, the n_segment can be changed with time. A case of extending an n_segment as a change of the n_segment with time is explained below.

Figure 12:
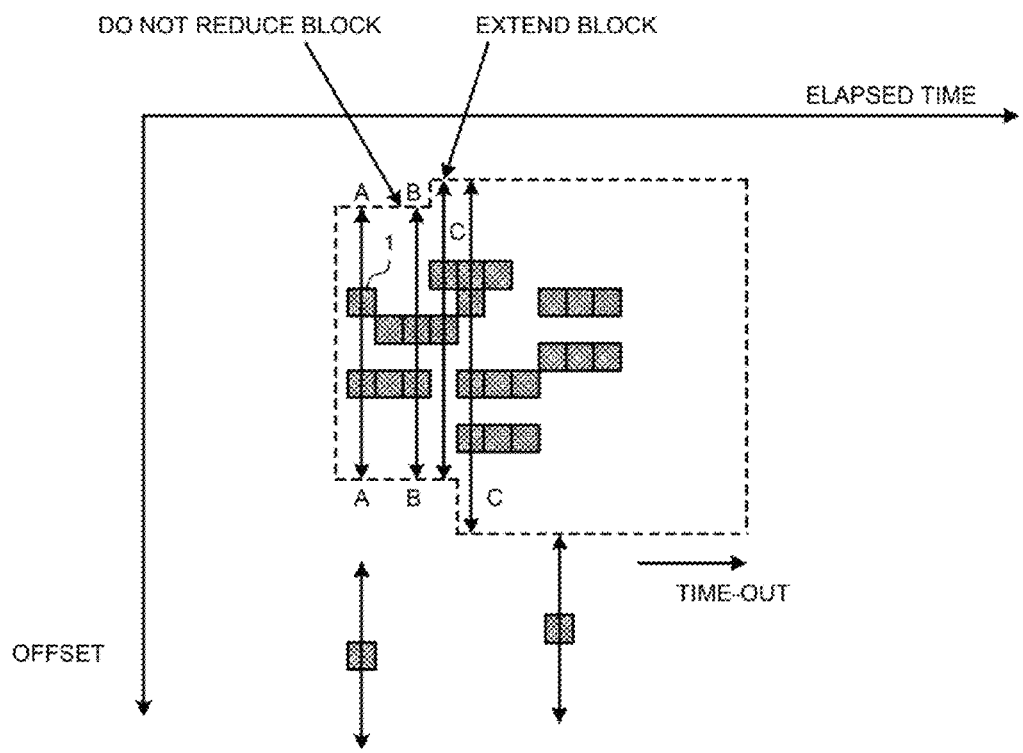
FIG. 12 is an explanatory diagram of dynamic hierarchical control by a hierarchical-storage control device that extends a block.

FIG. 12 is an explanatory diagram of dynamic hierarchical control by a hierarchical-storage control device that extends an n_segment, that is, a block. The hierarchical-storage control device that extends a block assumes an extended area and other extended areas connected to the extended area to be one extended area (A). The hierarchical-storage control device that extends a block then sets the extended area as a movement area whose data is moved to an SSD. In FIG. 12, the area between upper and lower broken lines is the movement area.

When the hierarchical-storage control device that extends a block determines a block area at a certain time point, the hierarchical-storage control device does not reduce the block area (B) but extends the block area with a lapse of time (C). When a hatched area 1 is not detected for a certain period of time, the hierarchical-storage control device that extends a block assumes such a state to be a time-out state and determines that the block ends.

According to such a hierarchical-storage control device that extends a block, a part of processes of the workload analysis unit 113 is different. Specifically, at Step S20 of FIG. 8, the workload analysis unit 113 compares information of the current n_segment whose data is instructed to be moved to the SSD 200 to the head segment number and the number of segments in the management table 115.

When the information of the current n_segment completely matches the head segment number and the number of segments of any of entries in the management table 115, the workload analysis unit 113 proceeds to Step S21. Also, when any of n_segment areas in the management table 115 is larger than the current n_segment, the workload analysis unit 113 proceeds to Step S21.

On the other hand, when any of the n_segment areas in the management table 115 is smaller than the current n_segment area, it is assumed that the n_segment has been extended. Therefore, the workload analysis unit 113 updates the management table 115 by the information of the current n_segment and proceeds to Step S21. In other cases, the workload analysis unit 113 registers the information of the current n_segment as a new entry in the management table 115 and proceeds to Step S21.

In this manner, when any of the n_segment areas in the management table 115 is smaller than the current n_segment area, the workload analysis unit 113 updates the management table 115 by the information of the current n_segment. Therefore, the hierarchical-storage control device can extend an n_segment with a lapse of time.

The hierarchical-storage control device 100 is realized by executing a hierarchical-storage control program having the same function as the hierarchical-storage control device 100 in a computer. A computer that executes the hierarchical-storage control program is explained below.

Figure 13:
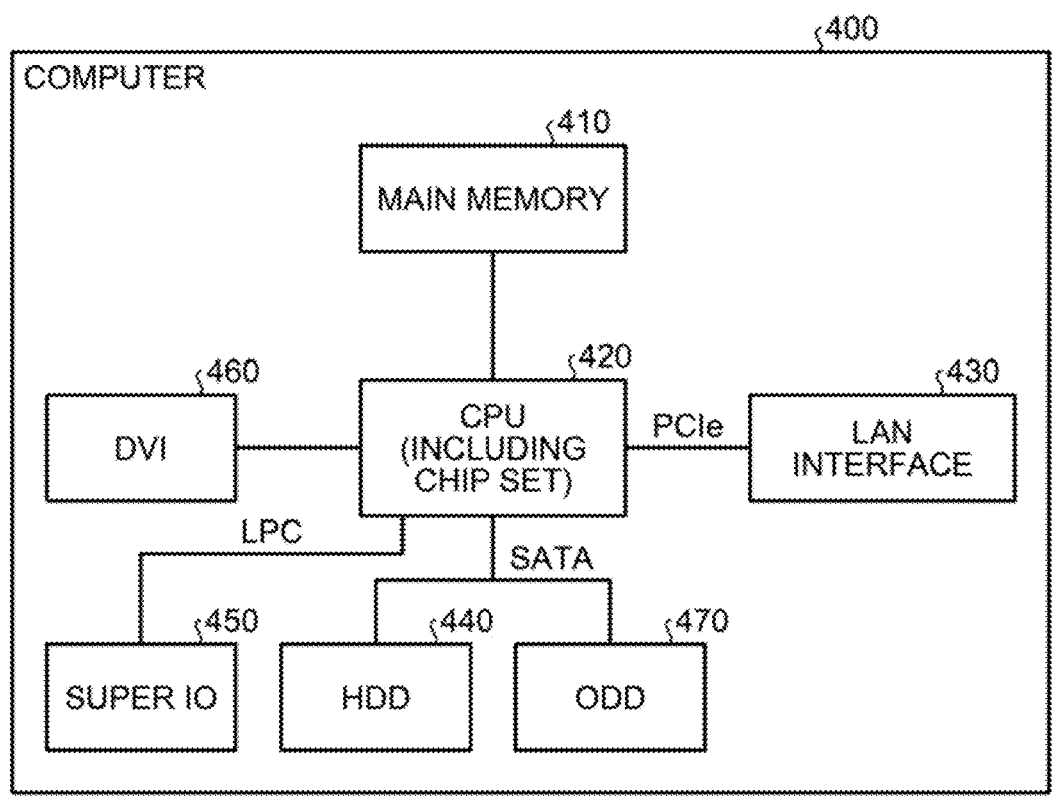
FIG. 13 depicts a hardware configuration of a computer that executes a hierarchical-storage control program.
Figure 14:
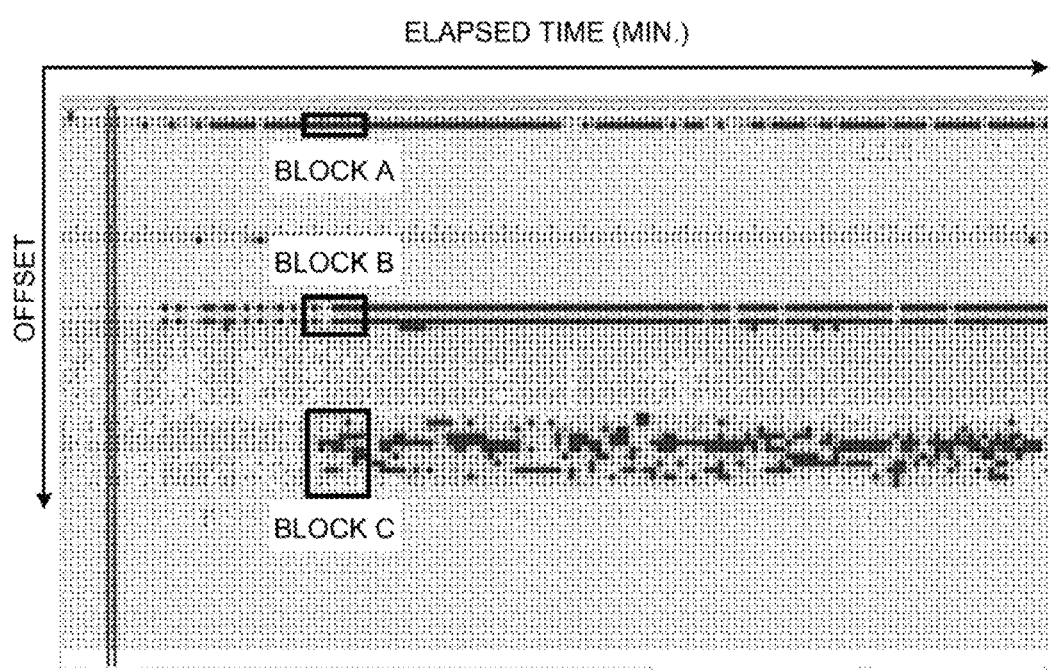
FIG. 14 is an example of a workload analysis.

FIG. 13 depicts a hardware configuration of the computer that executes the hierarchical-storage control program. As illustrated in FIG. 13, a computer 400 includes a main memory 410, a CPU (Central Processing Unit) 420, a LAN (Local Area Network) interface 430, and an HDD (Hard Disk Drive) 440. The computer 400 also includes a super IO (Input Output) 450, a DVI (Digital Visual Interface) 460, and an ODD (Optical Disk Drive) 470.

The main memory 410 is a memory that stores therein a program, a halfway result of execution of the program, and the like. The CPU 420 is a central processing unit that reads a program from the main memory 410 and executes the program. The CPU 420 includes a chip set having a memory controller.

The LAN interface 430 is an interface for connecting the computer 400 to other computers via a LAN. The HDD 440 is a disk device that stores therein a program and data, and the super IO 450 is an interface for connecting an input device such as a mouse and a keyboard to the computer 400. The DVI 460 is an interface for connecting a liquid-crystal display device to the computer 400, and the ODD 470 is a device that performs a read/write from/in a DVD.

The LAN interface 430 is connected to the CPU 420 by a PCI express, and the HDD 440 and the ODD 470 are connected to the CPU 420 by SATA (Serial Advanced Technology Attachment). The super IO 450 is connected to the CPU 420 by LPC (Low Pin Count).

The hierarchical-storage control program that is executed in the computer 400 is stored in a DVD, read from the DVD by the ODD 470, and installed in the computer 400. Alternatively, the hierarchical-storage control program is stored in databases of other computer systems connected to the computer 400 via the LAN interface 430 and the like, read from these databases, and installed in the computer 400. The installed hierarchical-storage control program is then stored in the HDD 440, read from the HDD 440 into the main memory 410, and executed by the CPU 420.

While the present embodiment has explained a hierarchical storage system using the SSD 200 and the HDD 300, the present invention is not limited thereto. For example, the present invention can be also applied to a hierarchical storage system using a cache memory and a main storage device. That is, the present invention can be applied not only to a hierarchical storage system of a non-volatile storage device but also to a hierarchical storage system including a volatile storage device.

According to one embodiment, it is possible to select an area appropriate as a neighborhood of a high load area.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium having stored therein a control program causing a computer to execute a process comprising:
    counting number of inputs and outputs for each unit area of a plurality of unit areas obtained by dividing an area that is used in a first storage device into a predetermined size;
    first identifying a unit area having the number of inputs and outputs larger than a first threshold as a high load area;
    second identifying an area obtained by combining an extended area in which an identified high load area and a unit area or unit areas within a predetermined distance from the high load area are connected to each other with other extended areas connected to the extended area, as a movement area; and
    moving data of an identified movement area to a second storage device that has a speed higher than that of the first storage device.

2. The non-transitory computer-readable storage medium having stored therein the control program according to claim 1, wherein
    the moving moves data of an extended movement area to the second storage device, when the movement area is extended with a lapse of time.

3. The non-transitory computer-readable storage medium having stored therein the control program according to claim 1, wherein
    the moving moves, among a plurality of movement areas, data of a movement area in which a rate of a sum of number of inputs and outputs to a total number of inputs and outputs exceeds a second threshold to the second storage device.

4. The non-transitory computer-readable storage medium having stored therein the control program according to claim 3, wherein
    the second identifying identifies the movement area at a certain time interval, and
    the moving moves, among movement areas having the rate exceeding the second threshold, data of a movement area having the rate continuously exceeding the second threshold for a predetermined number of times to the second storage device.

5. The non-transitory computer-readable storage medium having stored therein the control program according to claim 4, wherein
    the moving moves, among movement areas having the rate continuously exceeding the second threshold for the predetermined number of times, data of a movement area in which number of inputs and outputs is expected to exceed the first threshold for a time longer than a time for moving data to the second storage device, to the second storage device.

6. A control method of a storage control device, the control method comprising:
    counting number of inputs and outputs for each unit area of a plurality of unit areas obtained by dividing an area that is used in a first storage device into a predetermined size;
    first identifying a unit area having the number of inputs and outputs larger than a first threshold as a high load area;
    second identifying, using a processor, an area obtained by combining an extended area in which an identified high load area and a unit area or unit areas within a predetermined distance from the high load area are connected to each other with other extended areas connected to the extended area, as a movement area; and
    moving data of an identified movement area to a second storage device that has a speed higher than that of the first storage device.

7. A storage control device comprising:
    a counting unit that counts number of inputs and outputs for each unit area of a plurality of unit areas obtained by dividing an area that is used in a first storage device into a predetermined size;
    a high-load-area identification unit that identifies a unit area having number of inputs and outputs counted by the counting unit larger than a first threshold as a high load area;
    a movement-area identification unit that identifies an area obtained by combining an extended area in which a high load area identified by the high-load-area identification unit and a unit area or unit areas within a predetermined distance from the high load area are connected to each other with other extended areas connected to the extended area, as a movement area; and
    a movement unit that moves data of a movement area identified by the movement-area identification unit to a second storage device that has a speed higher than that of the first storage device.

* * * * *